United States Patent
Mueller et al.

(10) Patent No.: US 10,408,544 B2
(45) Date of Patent: Sep. 10, 2019

(54) COMPOSITE TOP CASE WITH EMBEDDED HEAT PIPES

(71) Applicant: BELL HELICOPTER TEXTRON INC., Fort Worth, TX (US)

(72) Inventors: Doug Mueller, Coppell, TX (US); Brian S. Modrzejewski, Keller, TX (US); Brad Ekstrom, Fort Worth, TX (US); Scott Gardner, Hurst, TX (US); David Elliott, Azle, TX (US)

( * ) Notice: Subject to any disclaimer, the term of this patent is extended or adjusted under 35 U.S.C. 154(b) by 248 days.

(21) Appl. No.: 14/282,370

(22) Filed: May 20, 2014

(65) Prior Publication Data
US 2015/0338170 A1    Nov. 26, 2015

(51) Int. Cl.
| | | |
|---|---|---|
| F28D 15/00 | (2006.01) | |
| F28D 15/02 | (2006.01) | |
| B64C 27/04 | (2006.01) | |
| B64D 33/10 | (2006.01) | |

(52) U.S. Cl.
CPC .............. *F28D 15/02* (2013.01); *B64C 27/04* (2013.01); *B64D 33/10* (2013.01); *F28D 15/0275* (2013.01)

(58) Field of Classification Search
CPC ...... F28D 15/02; F28D 15/0275; F28D 15/04; F28D 15/043; F28D 2015/0216
USPC .......................... 165/104.19, 104.21, 104.33
See application file for complete search history.

(56) References Cited

U.S. PATENT DOCUMENTS

| | | | | |
|---|---|---|---|---|
| 3,572,770 | A * | 3/1971 | Kagi | F16L 5/00 165/162 |
| 3,784,929 | A * | 1/1974 | Joy, Jr. | H01S 3/042 359/337 |
| 4,976,308 | A * | 12/1990 | Faghri | F28D 15/02 165/10 |
| 5,000,252 | A * | 3/1991 | Faghri | F28D 15/0275 165/10 |
| 5,086,831 | A * | 2/1992 | Paikert | B01D 53/8668 165/104.14 |
| 5,229,915 | A * | 7/1993 | Ishibashi | H01L 23/427 165/104.33 |
| 5,396,947 | A * | 3/1995 | Itoh | H01L 23/427 165/104.14 |
| 5,603,377 | A * | 2/1997 | Fujii | B01D 53/1475 165/116 |
| 5,687,690 | A * | 11/1997 | Kamiyama | F02B 67/06 123/198 R |
| 5,947,111 | A * | 9/1999 | Neulander | F24H 1/208 122/448.1 |
| 6,102,110 | A * | 8/2000 | Julien | F28D 15/0275 165/104.33 |
| 6,327,994 | B1 * | 12/2001 | Labrador | B01D 61/10 114/382 |
| 7,019,967 | B2 * | 3/2006 | DiFonzo et al. | G02F 1/133308 361/679.52 |
| 7,069,975 | B1 * | 7/2006 | Haws | B64G 1/50 165/10 |

(Continued)

Primary Examiner — Claire E Rojohn, III
(74) Attorney, Agent, or Firm — James E. Walton (57) ABSTRACT

A system and method to transfer heat energy through a composite structure. The system includes a heat pipe extending through a thickness of the composite material. The method includes extending a heat pipe through the composite material from a first surface exposed to the heat energy to a second surface exposed to airflow.

17 Claims, 8 Drawing Sheets

(56) References Cited

U.S. PATENT DOCUMENTS

| | | | | |
|---|---|---|---|---|
| 7,345,320 B2* | 3/2008 | Dahm | | A61C 19/003 |
| | | | | 165/117 |
| 2002/0014323 A1* | 2/2002 | Adamczyk | | F28D 15/0275 |
| | | | | 165/54 |
| 2003/0116309 A1* | 6/2003 | Dispenza | | B21D 53/085 |
| | | | | 165/151 |
| 2004/0099404 A1* | 5/2004 | Cipolla | | G06F 1/203 |
| | | | | 165/80.3 |
| 2004/0104011 A1* | 6/2004 | Crutchfield | | F28D 15/02 |
| | | | | 165/104.26 |
| 2008/0006394 A1* | 1/2008 | Gupta | | B60H 1/00 |
| | | | | 165/104.21 |
| 2008/0018180 A1* | 1/2008 | Neal | | H02K 9/20 |
| | | | | 310/54 |
| 2008/0074844 A1* | 3/2008 | Liaw | | F28D 15/02 |
| | | | | 361/702 |
| 2008/0196864 A1* | 8/2008 | Lin | | F28D 15/02 |
| | | | | 165/80.2 |
| 2009/0101314 A1* | 4/2009 | Lindner | | F28D 15/02 |
| | | | | 165/104.26 |
| 2009/0151920 A1* | 6/2009 | Polcyn | | C03B 5/237 |
| | | | | 165/185 |
| 2009/0320500 A1* | 12/2009 | Kim | | F25B 9/04 |
| | | | | 62/5 |
| 2010/0026108 A1* | 2/2010 | Hassett | | H02K 9/20 |
| | | | | 310/54 |
| 2010/0026109 A1* | 2/2010 | Hassett | | H02K 9/20 |
| | | | | 310/54 |
| 2010/0038065 A1* | 2/2010 | Yang | | F28F 13/00 |
| | | | | 165/185 |
| 2010/0038066 A1* | 2/2010 | Yang | | F28F 13/00 |
| | | | | 165/185 |
| 2010/0132925 A1* | 6/2010 | Lewis | | F28D 15/0233 |
| | | | | 165/104.26 |
| 2011/0205703 A1* | 8/2011 | Weaver | | G03B 15/006 |
| | | | | 361/695 |
| 2012/0039732 A1* | 2/2012 | Chang | | F04D 25/082 |
| | | | | 417/423.8 |
| 2012/0085519 A1* | 4/2012 | Chou | | F28D 15/02 |
| | | | | 165/104.26 |
| 2013/0014916 A1* | 1/2013 | Wadley | | E01C 11/26 |
| | | | | 165/104.21 |
| 2014/0116652 A1* | 5/2014 | Ehinger | | B64C 27/12 |
| | | | | 165/104.21 |
| 2014/0116654 A1* | 5/2014 | McGlaun | | B64C 27/12 |
| | | | | 165/104.26 |
| 2015/0168077 A1* | 6/2015 | Hodowanec | | F28D 15/0275 |
| | | | | 192/215 |
| 2015/0217863 A1* | 8/2015 | Modrzejewski | | B64C 27/001 |
| | | | | 416/1 |
| 2015/0316106 A1* | 11/2015 | Jackson | | F28F 1/24 |
| | | | | 384/467 |
| 2015/0338170 A1* | 11/2015 | Mueller | | F28D 15/02 |
| | | | | 165/104.21 |

* cited by examiner

COMPOSITE TOP CASE WITH EMBEDDED HEAT PIPES

GOVERNMENT LICENSE RIGHTS

The U.S. Government has a paid-up license in this invention and the right in limited circumstances to require the patent owner to license others on reasonable terms as provided for by the terms of FARDS Program Contract No. W911W6-10-2-0007.

BACKGROUND

1. Field of the Invention

The present application relates generally to heat transfer systems, more specifically, to heat pipes for an aircraft top case composed of composite materials.

2. Description of Related Art

Heat transfer systems for aircraft are well known in the art and are an effective means to cool down aircraft structure such as a transmission top case. It should be understood that during high speed use, a significant amount of heat is exerted on the transmission top case, which in turn requires one or more types of cooling systems to avoid failure. In some embodiments, the cooling system is merely a lubricating fluid such as oil and/or airflow passing over the top cover. These cooling systems have been shown to be effective in most applications. However, the cooling systems fail to adequately cool the transmission top case when the top case is composed of a composite material.

It should be understood that top cases and other devices associated with an aircraft are now being manufactured with lighter materials such as a composite material. Although the composite material has shown to be lightweight and durable, the material does not adequately transfer heat. As such, the conventional cooling methods to reduce the heat are inadequate and the transmission top case is prone to thermal overrun, which in turn could result in catastrophic failure.

Although the foregoing developments in the field of transmission top case cooling systems represent great strides, many shortcomings remain.

DESCRIPTION OF THE DRAWINGS

The novel features believed characteristics of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional cooling systems for transmission top cases. Specifically, the system of the present application includes one or more heat pipes extending through the thickness of the top case. The system is also contemplated having one or more of an evaporator, fins, and the like attached to the heat pipes to further increase heat transfer efficiency. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 1:
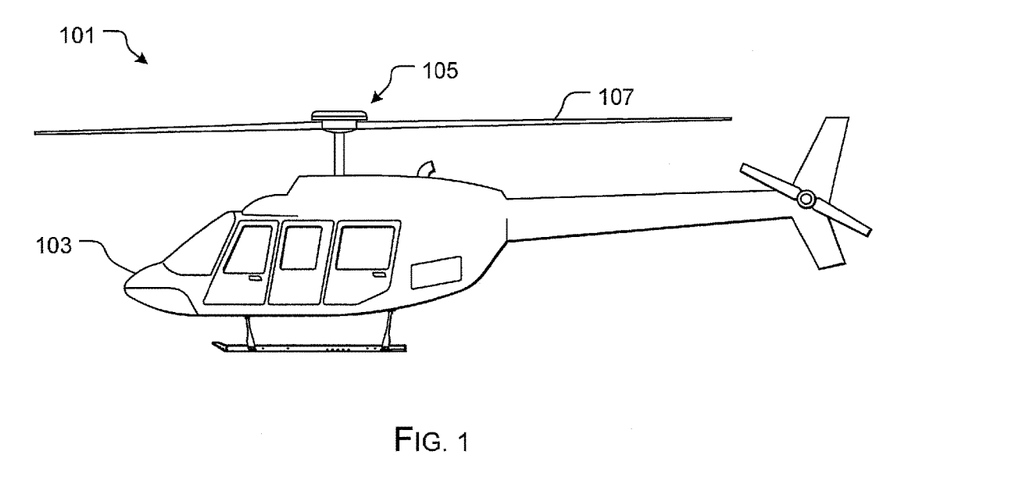
FIG. 1 is a side view of a helicopter in accordance with a preferred embodiment of the present application.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight. Carried by helicopter 101 is a transmission having a top case and a cooling system in accordance with a preferred embodiment of the present application, which is discussed in detail below and illustrated in the accompanying drawings.

Figure 2:
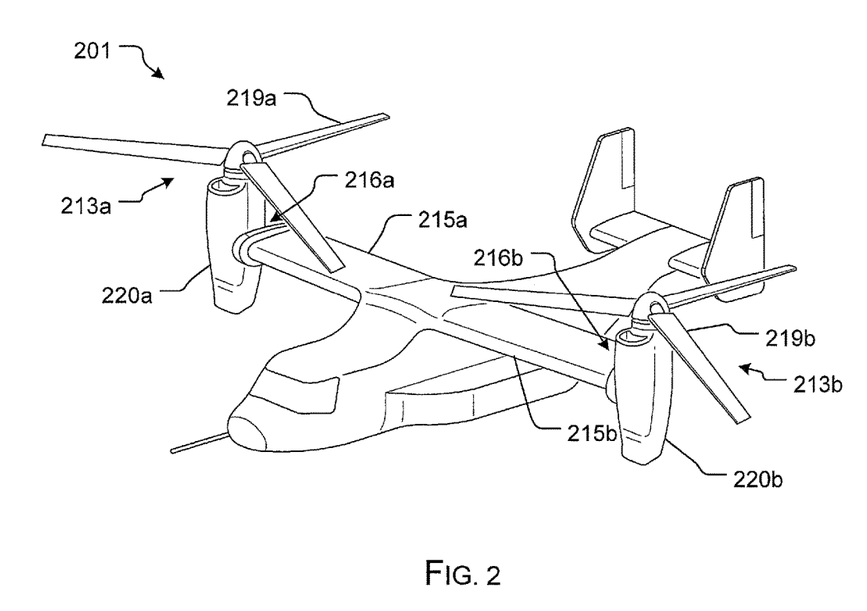
FIG. 2 is a perspective view of a tiltrotor aircraft according to an alternative embodiment of the present application.

Although shown associated with a helicopter, it will be appreciated that the system of the present application could also be utilized with different types of rotary aircraft and vehicles. For example, FIG. 2 illustrates a tiltrotor aircraft 201 that utilizes the system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

It will be appreciated that the cooling systems discussed herein can be utilized with different types of aircraft, vehicles, and/or machines composed of composite material and wherein a cooling system is necessary.

Figure 3:
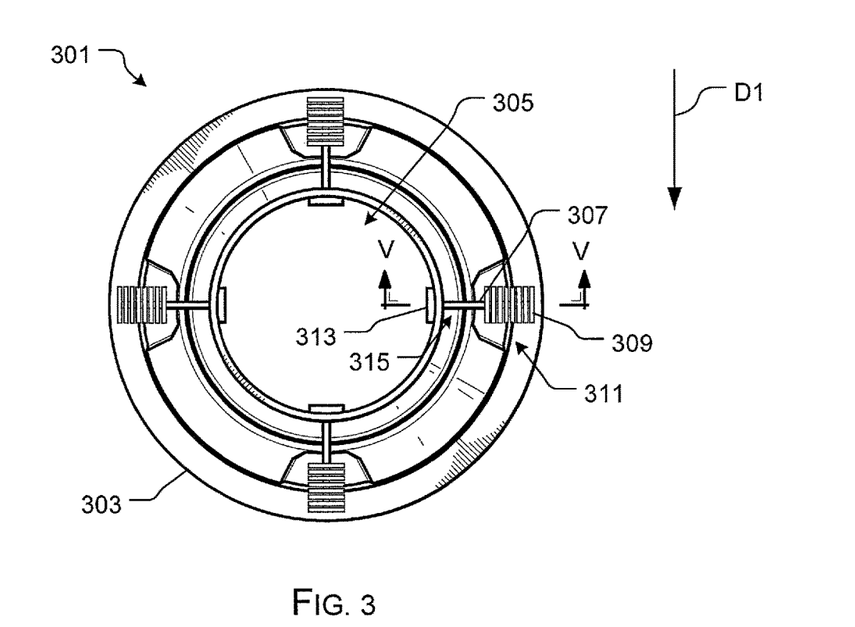
FIG. 3 is a top view of a cooling system in accordance with a preferred embodiment of the present application.
Figure 4:
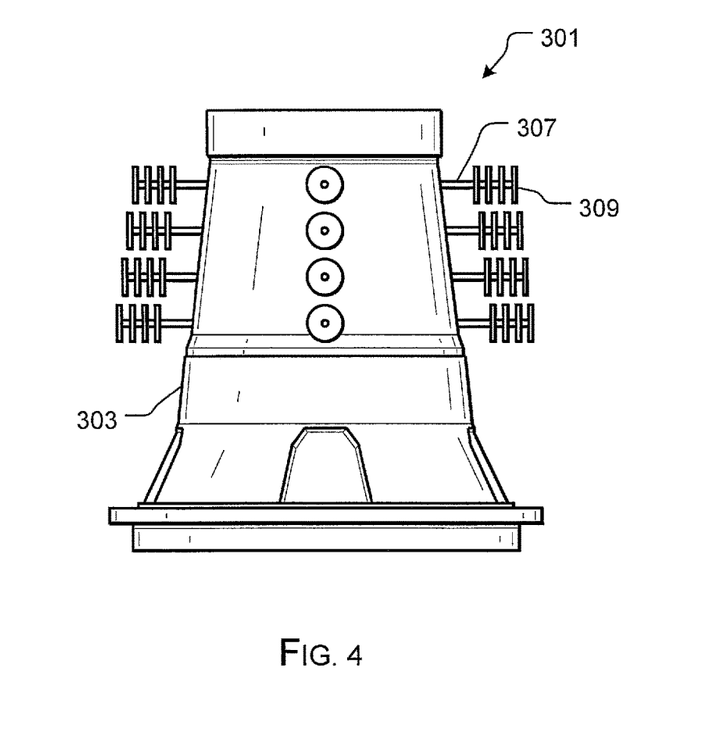
FIG. 4 is a front view of the cooling system of FIG. 3.
Figure 5:
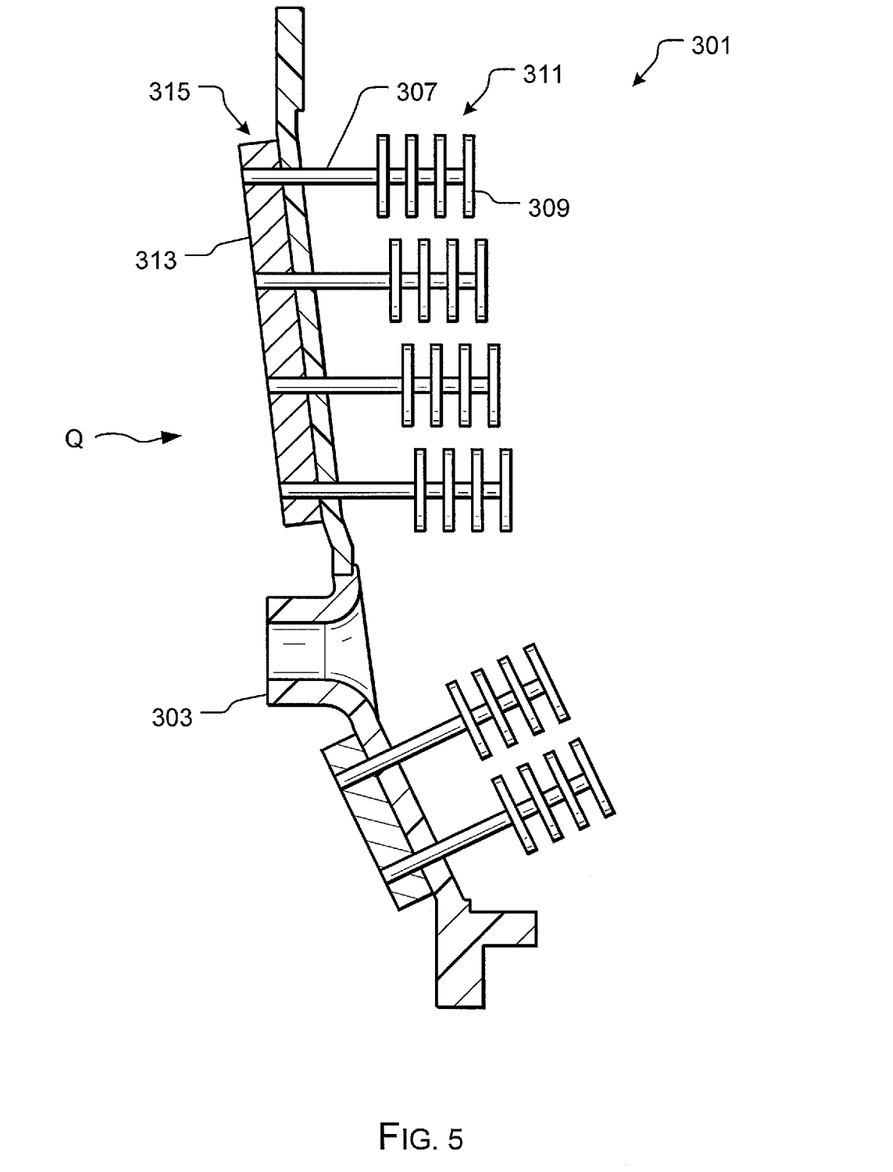
FIG. 5 is a cross-sectional view of the cooling system of FIG. 3 taken at III-III.

FIGS. 3-5 depict various view of a cooling system 301 in accordance with a preferred embodiment of the present application. In the contemplated embodiment, system 301 is operably associated with a transmission top case 303 having a body that forms an inner chamber 305. It should be understood that one or more different types of devices are housed within chamber 305 and radiate heat therein. In the exemplary embodiment, top case 303 is composed of a composite material, thereby decreasing the overall weight of the aircraft.

While composite materials are preferred because of their structural strength and light weight features, the composite materials are well insulated and do not provide effective means to passively self-cool. Thus, a cooling system is necessary to transfer heat from within chamber 305 to the airflow, as depicted with arrow D1, to self-cool. To achieve this feature, system 301 includes one or more heat pipes 307 that extend through the thickness of the top case 303 and configured to transfer heat energy from the inner chamber 305 to the airflow surrounding top case 303. For sake of clarity, only one heat pipe and associated devices are labeled. It will be appreciated that the number of heat pipes is a design choice and should not be limited to the number shown in the drawings.

In the contemplated embodiment, heat pipe 307 is a hollow shaft that preferably holds an inert gas or water vapor and/or wick therein for transferring the heat energy. However, alternative embodiments could include solid heat pipes and/or hollow heat pipes carrying different types of fluids and/or gasses therein; all being selected as a design choice to maximize heat transfer.

In the exemplary embodiment, system 301 utilizes a plurality of heat transfer fins 309 at a first end 311 of heat pipe 307 to increase the heat transfer contact surface area with the airflow. System 201 also preferably utilizes an elongated bar 313 composed of a material that collects heat energy and configured to communicate the heat energy to the heat pipes 307. Thus, in the preferred embodiment, the inner chamber 305 is cooled as heat energy is transferred through the heat pipes 307, fins 309, and the bar 313. Although shown as an elongated bar, it will be appreciated that bar 313 can extend around the entire periphery of the inner surface of the chamber 303 to maximize heat contact surface.

Figure 6:
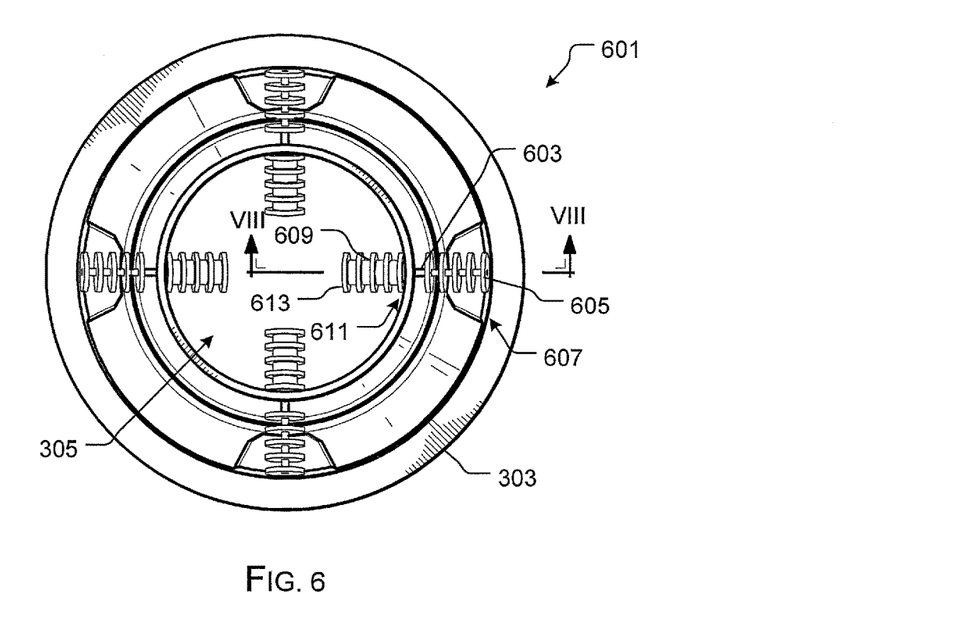
FIG. 6 is a top view of a cooling system in accordance with an alternative embodiment of the present application.
Figure 7:
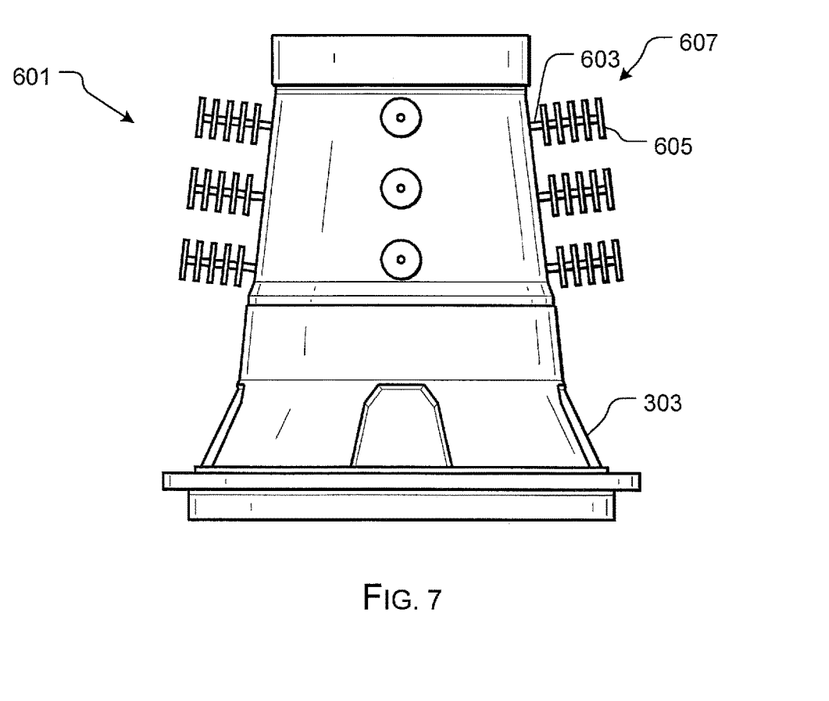
FIG. 7 is a front view of the cooling system of FIG. 6.
Figure 8:
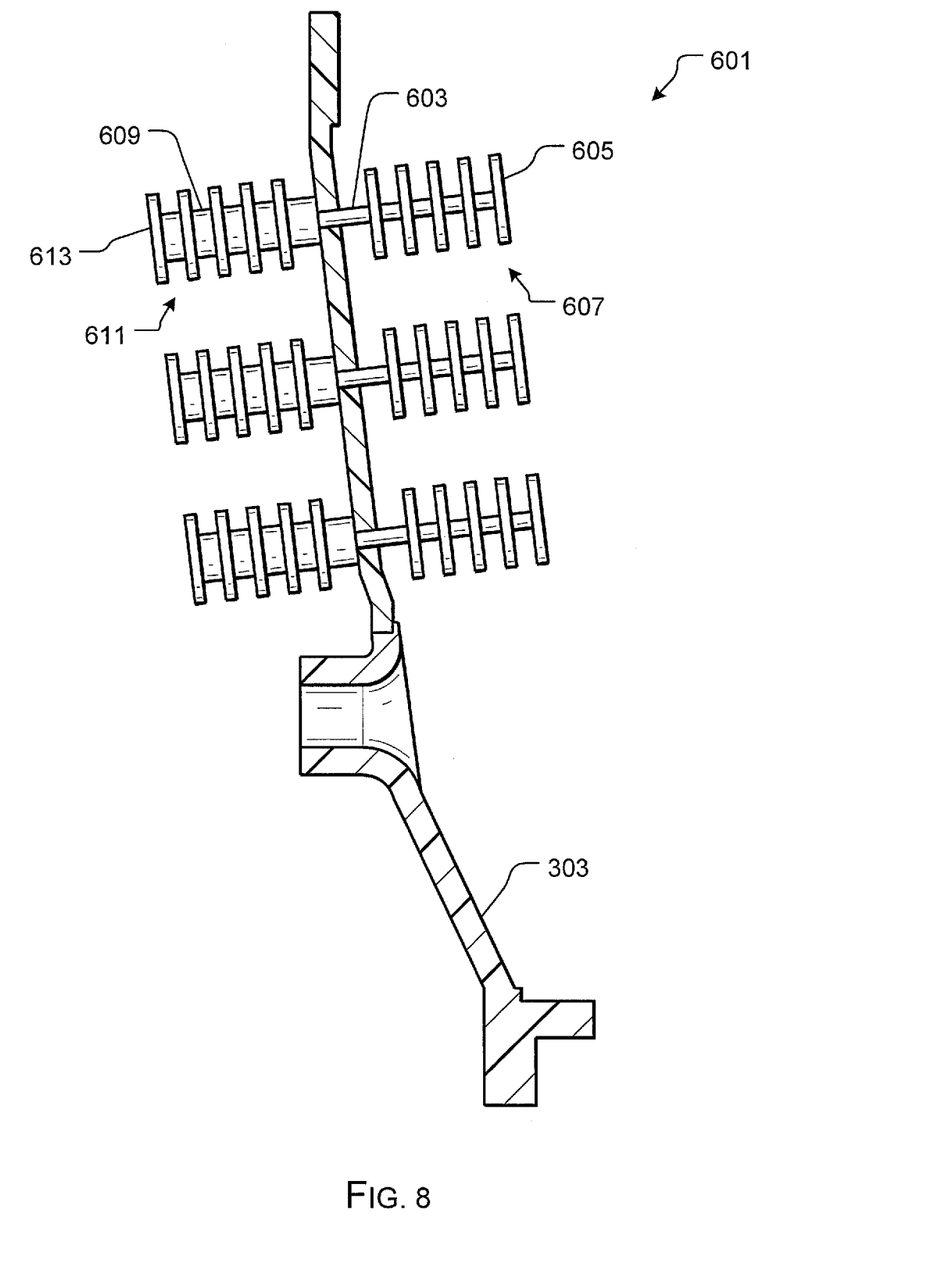
FIG. 8 is a cross-sectional view of the cooling system of FIG. 6 taken at VIII-VIII.

Referring now to FIGS. 6-8 in the drawings, various views of a cooling system 601 are shown in accordance with an alternative embodiment of the present application. It will be appreciated that system 601 includes one or more of the features discussed herein with respect to system 301 and is substantially similar in function. Specifically the system 601 is configured to transfer heat energy through the thickness of the top case 301 via one or more heat pipes.

System 601 preferably comprises of a heat pipe 603 having a plurality of fins 605 at a first end 607 and secured to a solid shaft 609 at a second end 611. As illustrated, shaft 609 extends within chamber 305 and a plurality of fins 613 is secured to the outer periphery of shaft 609. Thus, in the exemplary embodiment, the inner chamber 305 is cooled as heat energy is transferred through the heat pipes 603, fins 605, shaft 609, and fins 613.

Figure 9:
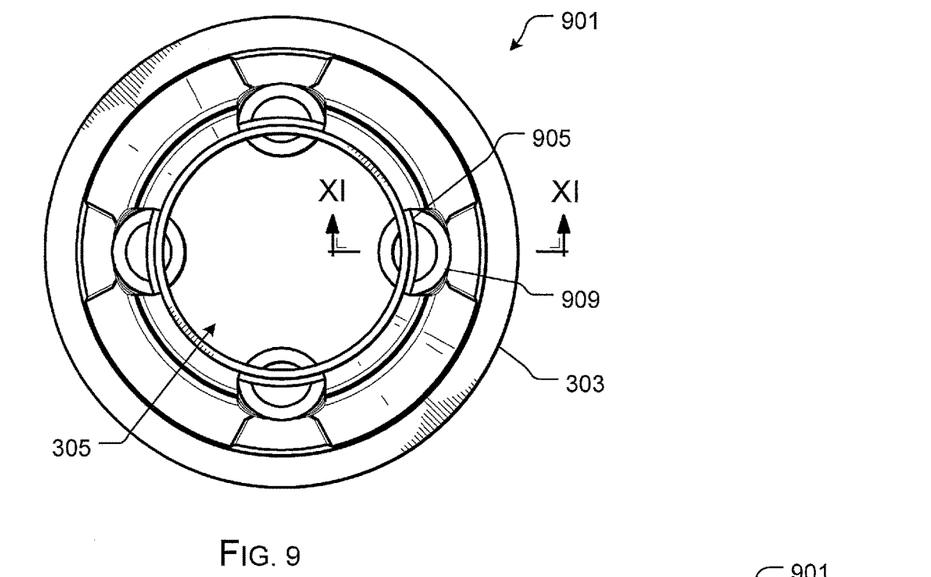
FIG. 9 is a top view of a cooling system in accordance with an alternative embodiment of the present application.
Figure 10:
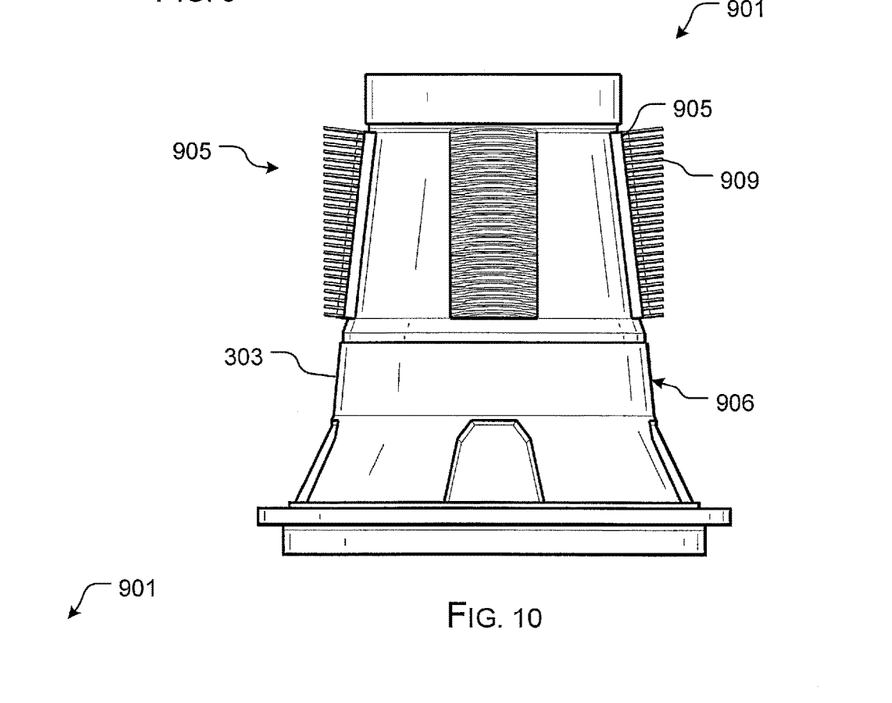
FIG. 10 is a front view of the cooling system of FIG. 9.
Figure 11:
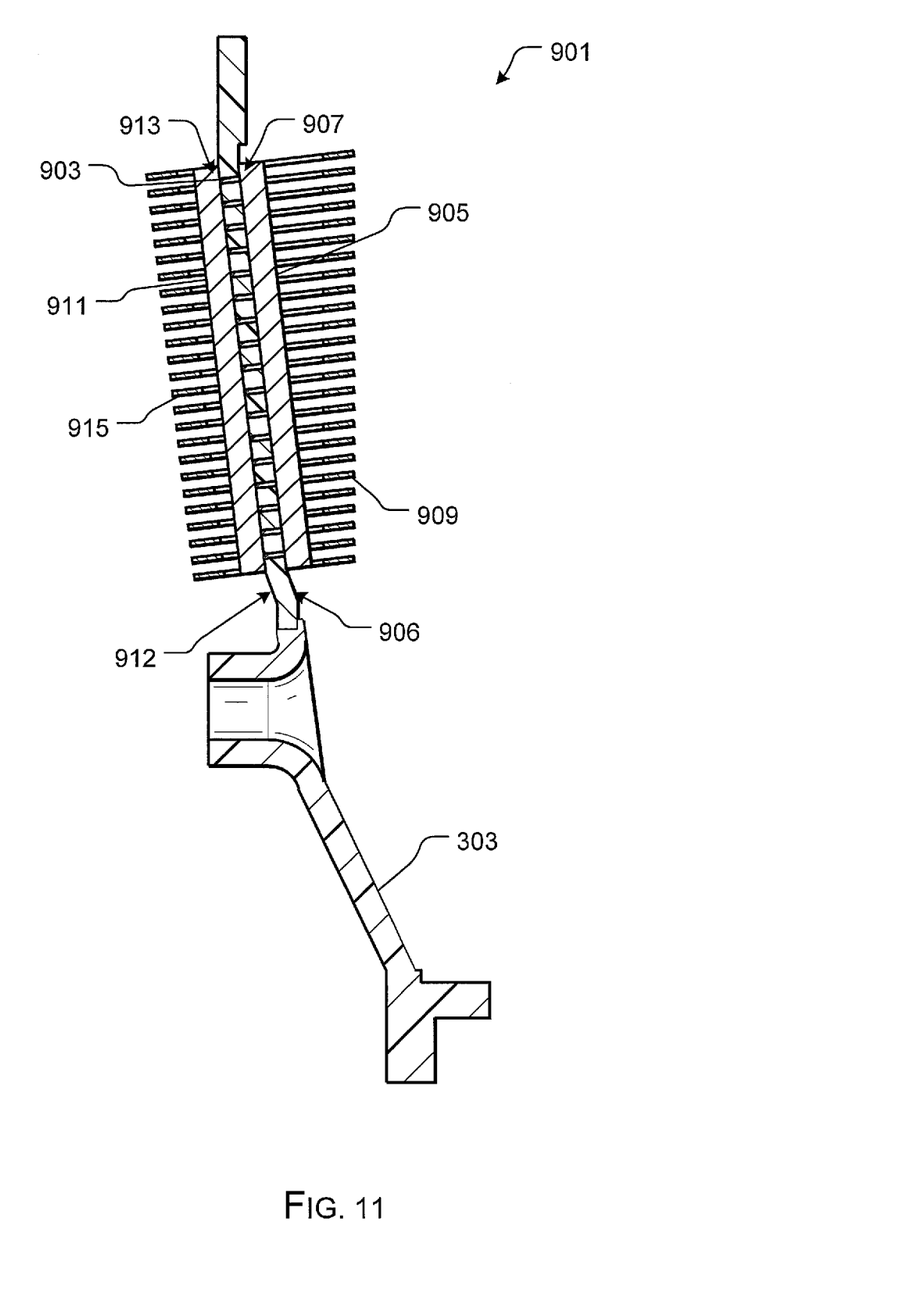
FIG. 11 is a cross-sectional view of the cooling system of FIG. 9 taken at IX-IX.

Referring now to FIGS. 9-11 in the drawings, various views of a cooling system 901 are shown in accordance with an alternative embodiment of the present application. It will be appreciated that system 901 includes one or more of the features discussed herein with respect to systems 301 and 601, and is substantially similar in function. Specifically the system 901 is configured to transfer heat energy through the thickness of the top case 301 via one or more heat pipes.

System 901 preferably comprises of a heat pipe 903 extending through the thickness of top case 303 and attached at a first end 907 to a base 905 secured to outer surface 906 of top case 303. A plurality of fins 909 extend from base 905 to increase contact surface area with the airflow passing around top case 303. Heat pipes 903 is also attached to a second base 911 at a second end 913, which in turn is secured to an inner surface 912 of top case 303. A plurality of fins 915 extend from base 911 towards the center of chamber 305. Thus, in the exemplary embodiment, the inner chamber 305 is cooled as heat energy is transferred through the heat pipes 903, bases 905, 911, and the plurality of fins 909, 915.

Figure 12:
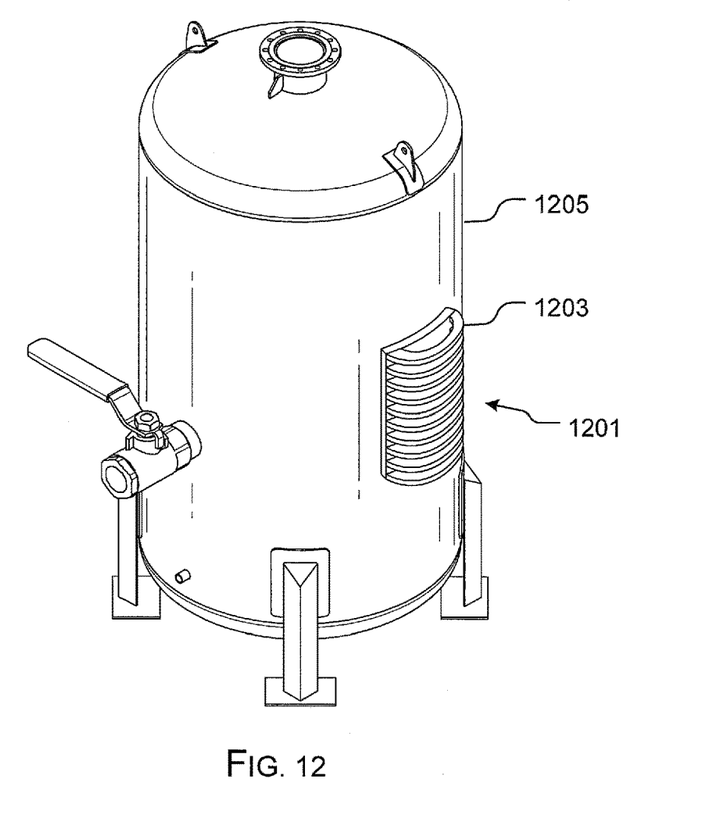
FIG. 12 is an oblique view of a cooling system in accordance with an alternative embodiment of the present application.
Figure 13:
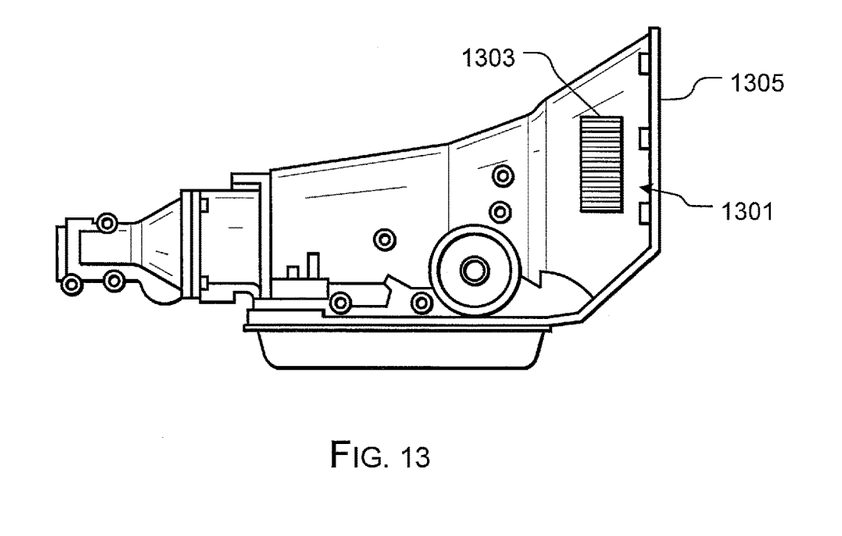
FIG. 13 is an oblique view of a cooling system in accordance with an alternative embodiment of the present application.

As depicted in FIGS. 12 and 13, the features discussed herein could also be utilized with alternative types of structures in lieu of the exemplary top case. For example, in FIG. 12, a cooling system 1201 includes a plurality of fins 1203 associated with a heat pipe (not shown) that extends through the thickness of the container to an inner chamber. Likewise, as shown in FIG. 13, a cooling system 1301 includes a plurality of fins associated with a heat pipe (not shown) that extends through the thickness of the transmission casing. Both systems 1201 and 1301 incorporate the features of one or more of the cooling systems discussed above and are effective means to transfer heat energy in one or more different types of bodies.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cooling system for a structure composed of composite material, comprising:
   a heat pipe extending through a thickness of the composite material from an inner surface of the thickness exposed to a heat energy to an outer surface of the thickness exposed to an airflow; and
   an elongated bar attached to the heat pipe at a first end;
   wherein the heat pipe is surrounded by the composite material about an entire outer circumference of the heat pipe along a portion of the heat pipe between the inner surface and the outer surface;
   wherein the elongated bar is secured to and upon the inner surface;
   wherein the heat pipe contacts the composite material;
   wherein the heat pipe is configured to transfer heat energy from an inner surface of the structure susceptible to heat energy buildup to an exposed surface in contact with airflow; and
   wherein the heat pipe is embedded in the composite material.

2. The system of claim 1, wherein the elongated bar is annular along the inner surface.

3. The system of claim 1, further comprising:
   a plurality of fins secured to a second end of the heat pipe;
   wherein the plurality of fins are exposed to the airflow.

4. The system of claim 1, further comprising:
   a base secured to an outer surface of the structure and attached the heat pipe;
   wherein the base is exposed to the airflow.

5. The system of claim 4, further comprising:
   a plurality of fins secured to and extending from the base.

6. The system of claim 5, further comprising:
   a second base secured to the inner surface of the structure and attached to the heat pipe.

7. The system of claim 6, further comprising:
   a plurality of fins secured to and extending from the second base.

8. The system of claim 1, further comprising:
   a shaft attached to the heat pipe and extending from the inner surface of the structure.

9. The system of claim 8, further comprising:
   a plurality of fins secured to the shaft.

10. The system of claim 9, further comprising:
    a plurality of fins secured to an end of the heat pipe;
    wherein the plurality of fins are exposed to the airstream.

11. The system of claim 1, wherein the heat pipe is hollow.

12. The system of claim 11, wherein the heat pipe houses an inert gas.

13. The system of claim 11, wherein the heat pipe houses water vapor.

14. A method to transfer heat energy through a composite structure, comprising:
    extending a heat pipe through a thickness of the composite material from an inner surface of the thickness exposed to the heat energy to an outer surface of the thickness exposed to airflow;
    wherein the heat pipe is embedded in the composite structure between the inner surface and the outer surface;
    wherein the heat pipe is surrounded by the composite material about an entire outer circumference of the heat pipe along a portion of the heat pipe between the inner surface and the outer surface; and
    wherein the heat pipe is in contact with the composite material.

15. The method of claim 14, further comprising:
    further transferring the heat energy by securing a plurality of fins to the heat pipe.

16. The method of claim 14, wherein the composite material is thermally non-conductive.

17. The system of claim 1, wherein the composite material is thermally non-conductive.

* * * * *